US011878283B2

(12) United States Patent
Estevez et al.

(10) Patent No.: US 11,878,283 B2
(45) Date of Patent: Jan. 23, 2024

(54) METHOD OF MAKING METAL-IMPREGNATED OXYGENATED HIERARCHICALLY POROUS CARBON

(71) Applicants: ADVANCED & INNOVATIVE MULTIFUNCTIONAL MATERIALS, LLC, Dayton, OH (US); THE UNIVERSITY OF DAYTON, Dayton, OH (US); Luis Estevez, Dayton, OH (US); Kenya Crosson, Beavercreek, OH (US)

(72) Inventors: Luis Estevez, Dayton, OH (US); Kenya Crosson, Beavercreek, OH (US)

(73) Assignees: Advanced & Innovative Multifunctional Materials, LLC, Dayton, OH (US); The University of Dayton, Dayton, OH (US)

( * ) Notice: Subject to any disclaimer, the term of this patent is extended or adjusted under 35 U.S.C. 154(b) by 0 days.

(21) Appl. No.: 17/761,680

(22) PCT Filed: Oct. 26, 2021

(86) PCT No.: PCT/US2021/056633
§ 371 (c)(1),
(2) Date: Mar. 18, 2022

(87) PCT Pub. No.: WO2022/093807
PCT Pub. Date: May 5, 2022

(65) Prior Publication Data
US 2023/0249153 A1    Aug. 10, 2023

Related U.S. Application Data

(60) Provisional application No. 63/105,856, filed on Oct. 26, 2020.

(51) Int. Cl.
*B01J 20/20* (2006.01)
*B22F 1/054* (2022.01)
*B01J 20/02* (2006.01)
*B01J 20/28* (2006.01)
*B01J 20/30* (2006.01)
(Continued)

(52) U.S. Cl.
CPC .......... *B01J 20/20* (2013.01); *B01J 20/0233* (2013.01); *B01J 20/28007* (2013.01);
(Continued)

(58) Field of Classification Search
None
See application file for complete search history.

(56) References Cited

U.S. PATENT DOCUMENTS

2014/0120339 A1    5/2014  Nikova et al.
2014/0216993 A1    8/2014  Pradeep et al.
(Continued)

OTHER PUBLICATIONS

Zhao et al., Oxygen-Rich Hierarchical Porous Carbon Derived from Artemia Cyst Shells with Superior Electrochemical Performance, ACS Appl. Mater. Interfaces, 2015, 7, 1132-1139. (Year: 2015).*
(Continued)

*Primary Examiner* — Chester T Barry
(74) *Attorney, Agent, or Firm* — Benjamen E. Kern; Thomas Y. Kendrick; Kern Kendrick, LLC

(57) ABSTRACT

In one aspect, an oxygenated hierarchically porous carbon (an "O-HPC") is provided, the O-HPC comprising: a hierarchically porous carbon (an "HPC"), the HPC comprising a surface, the surface comprising: (A) first order pores having an average diameter of between about 1 μm and about 10 μm; and (B) walls separating the first order pores, the walls comprising: (1) second order pores having a peak diameter between about 7 nm and about 130 nm; and (2) third order pores having an average diameter of less than about 4 nm, wherein at least a portion of the HPC surface has been subjected to $O_2$ plasma to oxygenate and induce a
(Continued)

negative charge to the surface. In one aspect, the O-HPC further comprises metal nanoparticles dispersed within the first, second, and third order pores. Methods for making and using the metal nanoparticle-impregnated O-HPCs are also provided.

8 Claims, 19 Drawing Sheets

(51) Int. Cl.
```
B01J 20/32      (2006.01)
C02F 1/28       (2023.01)
C02F 1/50       (2023.01)
C02F 103/00     (2006.01)
```

(52) U.S. Cl.
CPC ... *B01J 20/28066* (2013.01); *B01J 20/28076* (2013.01); *B01J 20/28083* (2013.01); *B01J 20/28085* (2013.01); *B01J 20/28092* (2013.01); *B01J 20/3064* (2013.01); *B01J 20/3071* (2013.01); *B01J 20/3078* (2013.01); *B01J 20/3085* (2013.01); *B01J 20/3204* (2013.01); *B01J 20/3214* (2013.01); *B01J 20/3236* (2013.01); *B22F 1/054* (2022.01); *C02F 1/283* (2013.01); *C02F 1/505* (2013.01); *B22F 2301/255* (2013.01); *C02F 2103/007* (2013.01); *C02F 2303/04* (2013.01); *C02F 2305/08* (2013.01)

(56) References Cited

U.S. PATENT DOCUMENTS

2019/0198862 A1  6/2019  Campbell et al.
2020/0020935 A1  1/2020  Costantino et al.

OTHER PUBLICATIONS

Alenka Vesel and Miran Mozetic New developments in surface functionalization of polymers using controlled plasma treatments, 2017 J. Phys. D: Appl. Phys. 50 293001 (Year: 2017).*

Hosseini et al., Surface functionalization of carbon nanotubes via plasma discharge: A review, Inorganic Chemistry Communications 138 (2022) 109276 (Year: 2022).*

Cárdenas Riojas, et al. Development of a new electrochemical sensor based on silver sulfide nanoparticles and hierarchical porous carbon modified carbon paste electrode for determination of cyanide in river water samples, Sensors and Actuators B: Chemical, vol. 287, 2019, 544-550 (Year: 2019).*

International Preliminary Report on Patentability issued in PCT/US21/56633 on May 2, 2023.

International Search Report and Written Opinion issued in PCT/US21/056633, dated Jan. 18, 2022.

Estevez et al. A facile approach for the synthesis of monolithic hierarchical porous carbons—high performance materials for amine based CO2 capture and supercapacitor electrode, Energy & Environmental Science, vol. 6, May 3, 2013, pp. 1785-1790.

Hamad, et al. Irreversible membrane fouling abatement through pre-deposited layer of hierarchical porous carbons. Water research, vol. 65, 2014, pp. 245-256.

Estevez, et al. Tunable Oxygen Functional Groups as Electrocatalysts on Graphite Felt Surfaces for All-Vanadium low Batteries. ChemSusChem 2016, 9(12), 1455-1461.

Estevez, et al. Hierarchically Porous Graphitic Carbon with Simultaneously High Surface Area and Colossal Pore vol. Engineered via Ice Templating. ACS nano 2017, 11(11), 11047-11055.

Estevez, et al. Hierarchically Porous Carbon Materials for CO 2 Capture: The Role of Pore Structure. Ind. Eng. Chem. Res. 2018, vol. 57, pp. 1262-1268.

* cited by examiner

Table 1. Textural characteristics for HPC materials (excluding pores >300 nm)

| Sample ID | Colloidal SiO$_2$ template size | Ratio (wt.) of SiO$_2$ to sucrose | BET SSA (m$^2$/g)* | Pore Vol. (cm$^3$/g)* | Pore size by volume (nm)* | CO$_2$ activation? |
|---|---|---|---|---|---|---|
| HPC-1 | 4 nm | 2:1 | 1292 | 4.8 | 25 | No |
| HPC-1-act | 4 nm | 2:1 | 2675 | 10.6 | 40-50 | Yes |
| HPC-2 | 4 nm | 1:2 | 818 | 1.5 | 7-10 | No |
| HPC-2-act | 4 nm | 1:2 | 2717 | 4.5 | 7-10 | Yes |
| HPC-3 | 115 nm | 3:1 | 897 | 7.1 | ~130† | No |
| HPC-4 | 4 nm | 1:1 | 1316 | 2.3 | 5-6 | No |
| HPC-4-act | 4 nm | 1:1 | 2096 | 3.0 | 6-7 | Yes |
| HPC-5 | 4 nm | 2:1 | 1327 | 4.1 | 20 | No |
| HPC-6 | 8 nm | 1:1 | 1129 | 2.0 | 8 | No |
| HPC-7 | 8 nm | 2:1 | 1265 | 3.6 | 10 | No |
| HPC-8 | 12 nm | 1:1 | 893 | 1.9 | 12 | No |
| HPC-9 | 12 nm | 2:1 | 1216 | 3.0 | 12 | No |
| HPC-10 | 20 nm | 1:1 | 841 | 1.9 | 20 | No |
| HPC-11 | 20 nm | 2:1 | 1289 | 3.7 | 20 | No |

*Surface area, pore volume and pore size distribution (PSD) determined by N$_2$ porosimetry †TEM for PSD

FIG. 3

Table 2. X-ray photoelectron spectroscopy analysis for O₂ plasma functionalization of carbon

| Porous carbon cloth | Elemental atomic % | | | | | Oxygen groups At. % | | |
|---|---|---|---|---|---|---|---|---|
| | C | O | Na | Si | Sn | C-C | C-O | C=O | O-C=O |
| Porous carbon – neat | 97.5 | 2.5 | - | - | - | 80.5 | 19.5 | 0.0 | 0.0 |
| Porous carbon – 60 min O₂ plasma | 85.6 | 13.3 | 0.6 | 0.5 | 0.1 | 64.6 | 16.2 | 14.4 | 5.0 |
| HPC vs. O-HPC | C | O | Na | Si | Sn | C-C | C-O | C=O | O-C=O |
| HPC-1-act | 98.5 | 1.5 | - | - | - | 85.5 | 7.0 | 3.7 | 3.6 |
| O-HPC (60 min O₂ plasma) | 93.6 | 5.9 | - | 0.5 | - | 63.3 | 20.7 | 11.0 | 5.1 |

FIG. 5

| Table 3: analysis of HPC and O-HPC isotherms and values for various textural properties ||||
|---|---|---|---|
| Sample: | HPC | O-HPC | % Variance |
| BET SSA [m²/g] | 2029 | 2090 | 2.9% |
| BJH adsorption pore volume [cm³/g] | 9.15 | 9.21 | 0.7% |
| Total pore volume at P/Po ~0.995 [cm³/g] | 9.37 | 9.71 | 3.5% |
| t-method micropore SSA [m²/g] | 388 | 415 | 6.5% |

FIG. 11

METHOD OF MAKING METAL-IMPREGNATED OXYGENATED HIERARCHICALLY POROUS CARBON

CROSS-REFERENCE TO RELATED APPLICATIONS

This application claims priority from U.S. Provisional Patent Application No. 63/105,401, filed on Oct. 26, 2020, which is incorporated by reference herein in its entirety.

BACKGROUND

Many metal cations are known to have beneficial properties. For example, silver cations are known to have biocidal properties.

Use of metal cations in nanoparticle form can vastly improve their effectiveness, due to the nanoparticles' high surface area to volume ratios. Metal nanoparticles have been applied to carbon-containing compounds, but often the metal must be embedded partially within the carbon-containing compound for adequate attachment, which in turn limits the surface area of the metal that is available to interact.

What is needed is a carbonaceous substrate and a process to attach metal nanoparticles to the surface of the carbonaceous substrate, while ensuring that the nanoparticles are accessible.

SUMMARY

In one aspect, an oxygenated hierarchically porous carbon (an "O-HPC") is provided, the O-HPC comprising: a hierarchically porous carbon (an "HPC"), the HPC comprising a surface, the surface comprising: (A) first order pores having an average diameter of between about 1 μm and about 10 μm; and (B) walls separating the first order pores, the walls comprising: (1) second order pores having a peak diameter between about 7 nm and about 130 nm; and (2) third order pores having an average diameter of less than about 4 nm, wherein at least a portion of the HPC surface has been subjected to $O_2$ plasma to oxygenate and induce a negative charge to the surface. In one aspect, the O-HPC further comprises metal nanoparticles dispersed within the first, second, and third order pores. In one aspect, greater than 50% of the metal nanoparticles are dispersed within the second order pores.

In one aspect, a method for making a metal-impregnated O-HPC is provided, the method comprising: (A) preparing an HPC, the preparing comprising the steps of: (1) mixing a carbon source, e.g., a saccharide, a cellulosic material, or a polyacrylonitrile (a "carbon precursor"), with water and silica; (2) freezing the mixture, thereby forming a solid carbon precursor-silica composite comprising first order pores on a surface of the solid carbon precursor-silica composite, the first order pores having an average diameter of about 1 μm to about 10 μm, and further comprising walls separating each first order pore; (3) subliming frozen water from the frozen mixture; (4) pyrolyzing the solid carbon precursor-silica composite to form a carbon-silica composite, a surface of which maintains the first order pores and the walls; and (5) etching away the silica from the carbon-silica composite to form an HPC, a surface of which maintains the first order pores and the walls, the etching further forming second order pores in the walls, the second order pores having a peak diameter between about 7 nm and about 130 nm; (B) physically activating the HPC surface by flowing $CO_2$ gas over the HPC surface at an elevated temperature, thereby introducing into the walls third order pores having an average diameter of less than about 4 nm; (C) treating the activated HPC surface with an $O_2$ plasma to oxygenate and thereby induce a negative charge on at least a portion of the activated HPC surface to form an O-HPC; (D) contacting the O-HPC's surface with an aqueous solution of a water-soluble metal salt (such as silver nitrate, $AgNO_3$), whereupon the metal ions attach to the O-HPC surface; and (E) reducing the attached metal ions into metal nanoparticles.

BRIEF DESCRIPTION OF THE FIGURES

The accompanying figures, which are incorporated in and constitute a part of the specification, illustrate various example processes, devices, and results.

FIG. 3 illustrates textural characteristics for various HPC materials.

FIG. 5 illustrates example X-ray photoelectron spectroscopy ("XPS") analysis for $O_2$ plasma functionalization of carbon.

FIG. 11 (Table 3) shows the values for the various textural properties of the nitrogen porosimetry isotherms of the HPC and the O-HPC samples shown in FIGS. 8 and 9, respectively.

DETAILED DESCRIPTION

In one aspect, an O-HPC is provided, the O-HPC comprising: an HPC, the HPC comprising a surface, the surface comprising: (A) first order pores having an average diameter of between about 1 µm and about 10 µm; and (B) walls separating the first order pores, the walls comprising: (1) second order pores having a peak diameter between about 7 nm and about 130 nm; and (2) third order pores having an average diameter of less than about 4 nm, wherein at least a portion of the HPC surface has been subjected to $O_2$ plasma to oxygenate and induce a negative charge to the surface. In one aspect, the O-HPC further comprises metal nanoparticles dispersed within the first, second, and third order pores. In one aspect, greater than 50% of the metal nanoparticles are dispersed within the second order pores.

Hierarchically Porous Carbons

HPCs, including their preparation and characterization, are known. See, e.g., Estevez, L. et al.; A Facile Approach for the Synthesis of Monolithic Hierarchical Porous Carbons-High Performance Materials for Amine Based $CO_2$ Capture and Supercapacitor Electrode. Energy Environ. Sci. 2013, 6, 6, 1785-1790; Estevez, L. et al.; Hierarchically Porous Graphitic Carbon with Simultaneously High Surface Area and Colossal Pore Volume Engineered via Ice Templating. ACS Nano 2017, 11, 11, 11047-11055, each of which is incorporated by reference herein in its entirety.

Figure 1:
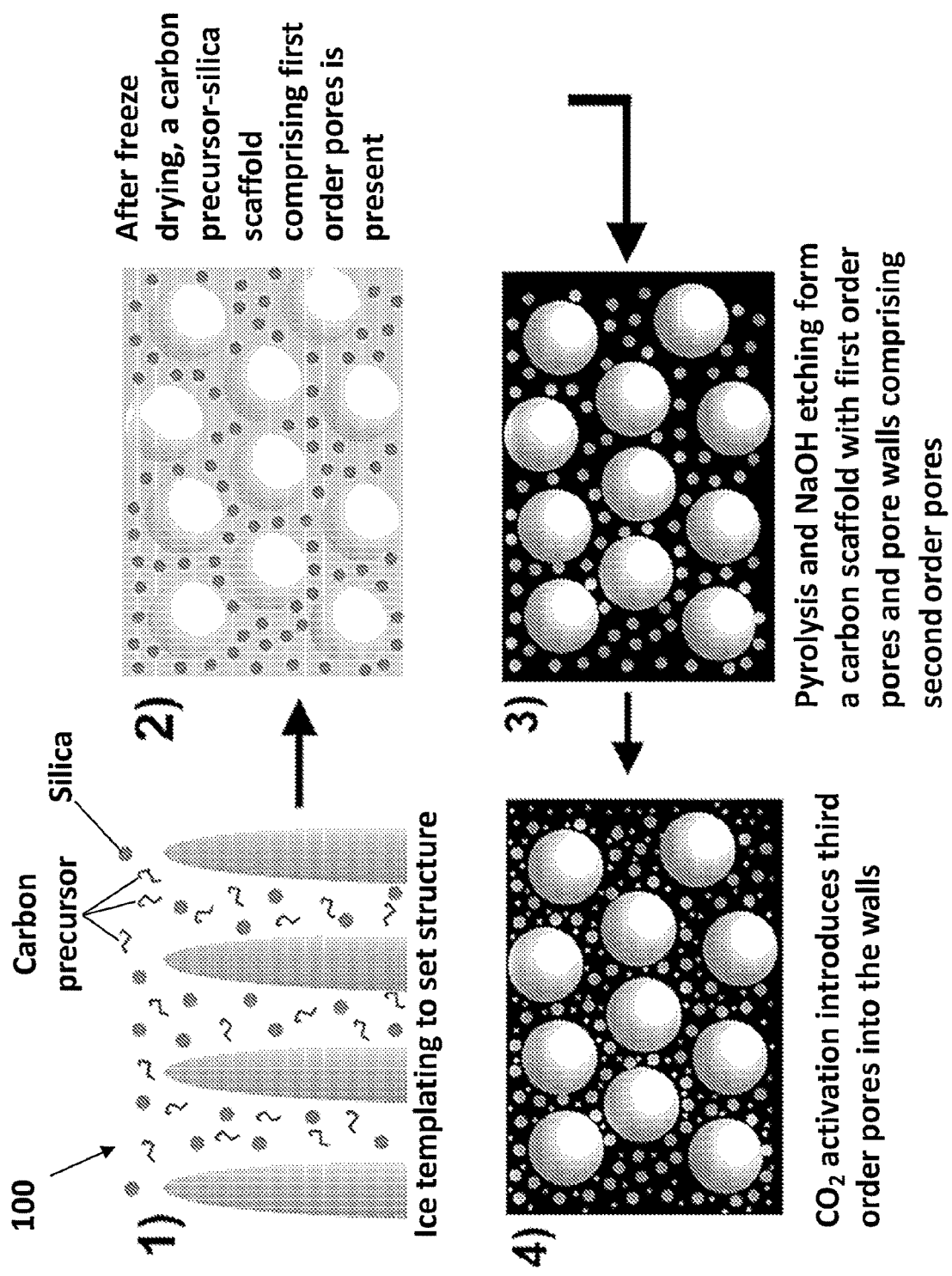
FIG. 1 illustrates an example HPC synthesis procedure 100.

FIG. 1 illustrates an HPC synthesis process 100. Process 100 uses the technique of ice templating, including (step (1)) freezing a mixture of colloidal silica, carbon precursor, and water in liquid nitrogen and (step (2)) subliming the ice via lyophilization, leaving behind a solid carbon precursor-silica composite comprising relatively large (an average diameter of about 1 µm and about 10 µm) first order pores. The composite is pyrolyzed, converting the carbon precursor into carbon (step (3)). The silica is etched away using NaOH to form second order pores, the second order pores having a peak diameter between about 7 and about 130 nm, in walls separating the first order pores. By "having a peak diameter between about 7 and about 130 nm" or a substantially similar phrase is meant that at least 50% of the second order pores have a particular diameter that falls within that range. For example, in one aspect, at least 50% of the second order pores have a diameter of about 40 nm. In other aspects, at least 50% of the second order pores have a diameter of about 7 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, about 100 nm, about 105 nm, about 110 nm, about 115 nm, about 120 nm, about 125 nm, or about 130 nm. As described herein, this peak diameter is tunable within the range depending on the desired properties of the O-HPC. After washing the porous carbon (now an HPC), a final step (step (4)) of physical activation is employed by flowing $CO_2$ gas over the HPC surface at high heat, resulting in slow etching of the carbon via the overall reaction mechanism: $CO_2$ (g)+C (s)→2CO (g). This $CO_2$ activation introduces yet smaller (sub-5 nm, sub-4 nm, or even sub-2 nm) third order pores in the walls separating the first order pores and broadens out the second order pores formed by the colloidal silica template, resulting in an increase of both the surface area and the overall pore volume of the HPC material as shown in the increased textural characteristics from the "HPC-1" (illustrated in step (3)) to the "HPC-1-act" (illustrated in step (4) and shown in FIG. 3, Table 1) materials. The result is an HPC with three distinct pore size regimes of first, second, and third order pores from three distinct pore forming processes (ice templating, silica templating, and physical activation, respectively).

Figure 2A:
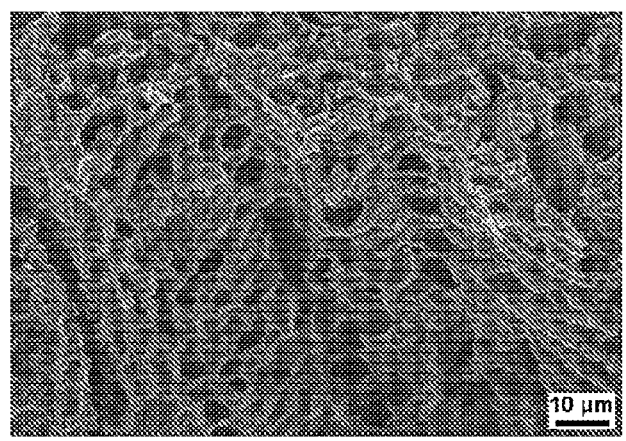
FIG. 2A illustrates a scanning electron microscopy ("SEM") image of first order pores produced via ice templating (procedure 100).
Figure 2B:
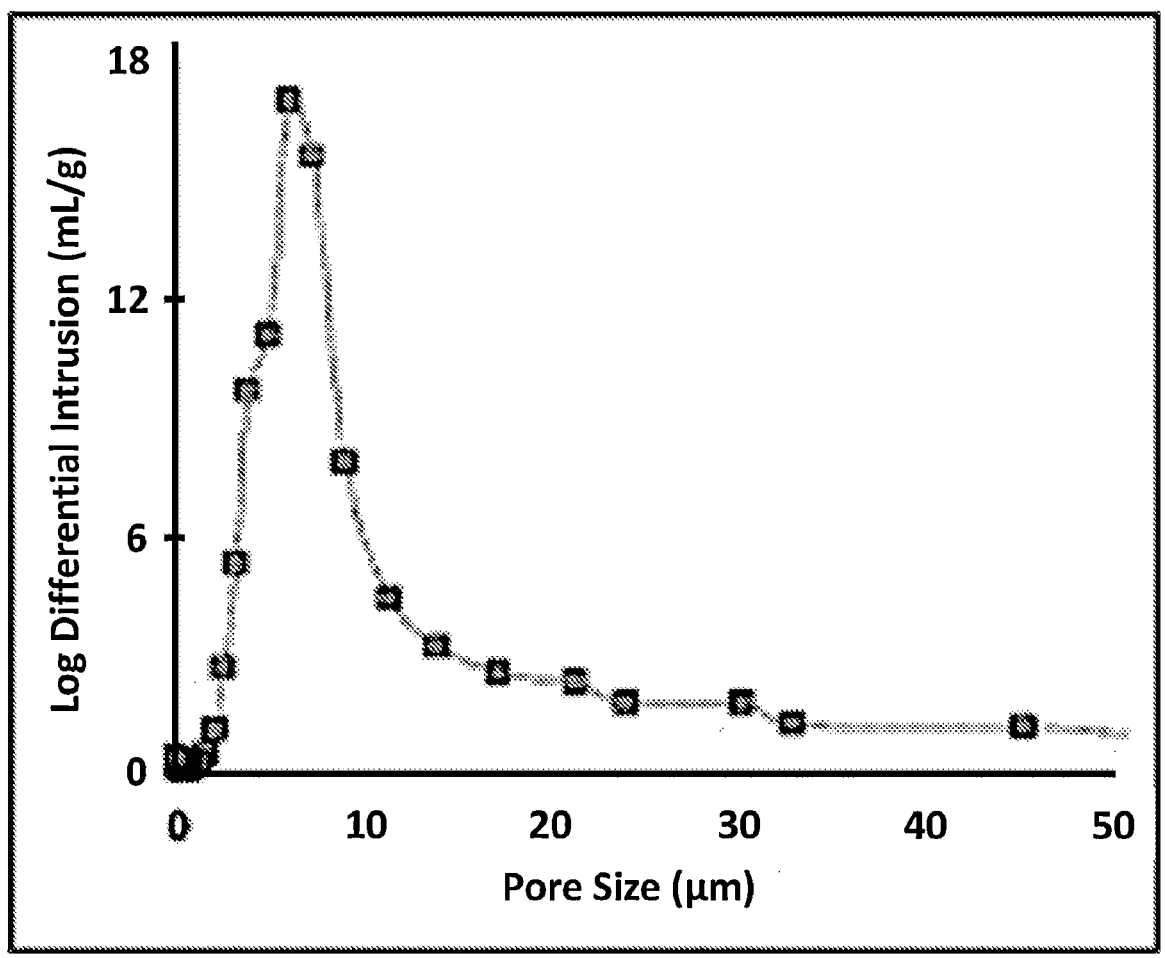
FIG. 2B graphically illustrates the pore size distribution of FIG. 2A verified via mercury porosimetry.

FIG. 2A illustrates an SEM image of the first order pores produced via ice templating (procedure 100). The first order pores may be on the order of magnitude of 1-10 µm. FIG. 2B graphically illustrates the pore size distribution of FIG. 2A verified via mercury porosimetry.

FIG. 3 illustrates a table (Table 1). Table 1 reveals the vast tunability for the second order pores within the HPC walls separating the first order pores. Both the size of the removable silica template and the ratio of silica to the carbon precursor (e.g., sucrose, glucose, polyacrylonitrile, or various other common carbon precursors) will dictate the size of the second order pores. The third order pore-forming technique of $CO_2$ activation introduces sub-4 nm pores and can modify the textural properties (surface area, pore volume, and pore size) as well. As shown in Table 1, surface area, pore volume, and pore size distribution were determined by $N_2$ porosimetry. In Table 1, rows HPC-1-HPC-3 used sucrose as the carbon precursor, whereas rows HPC-4-HPC-11 used glucose as the carbon precursor.

The unique modifiable nature of all three templating processes enables the HPCs to function as a tunable materials platform, with the capability to engineer the required textural characteristics for the HPC host. This flexibility and multimodal porosity have resulted in the synthesis of HPCs with an unprecedented combination of specific surface area (2000-2500 m$^2$/g) and pore volume (5-10 cm$^3$/g). Pore volume values of 5 and 10 cm$^3$/g (~90 and ~95 vol. % porosity) show the highly porous nature of the HPCs. This porosity does not even include the void space available from the ~1-10 µm first order pores.

Figure 4:
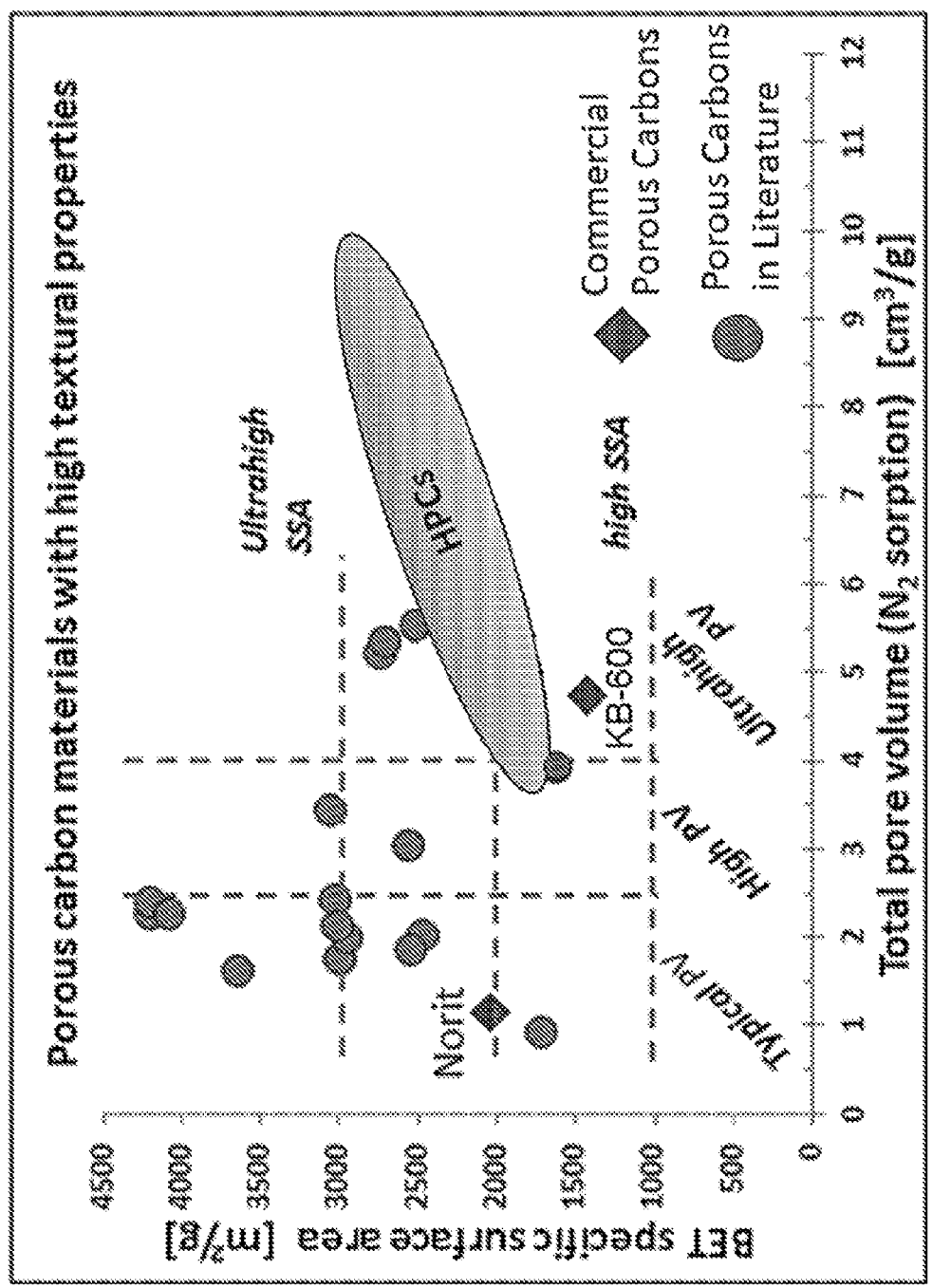
FIG. 4 illustrates a graph comparing previous porous carbons with HPCs.

FIG. 4 shows porous carbons with either high specific surface area ("SSA") or large pore volume and how the HPCs disclosed herein compare. FIG. 4 illustrates that the HPCs developed using the processes described herein have an unprecedented level of both high SSA and extremely large pore volume (void space) values, which two properties are often mutually exclusive. Having these two properties together in one porous carbon material is unique and very important for obtaining a desired homogeneous dispersion of impregnated nanoparticles, as the high SSA provides a suitable surface for attachment of the nanoparticles, while the large pore volume allows for the loading of high wt. % nanoparticles, all while maintaining substantial porosity. The HPC materials described herein represent the highest known pore volume values for sub-100 nm pores, indicating the vast void space available for nanoparticle impregnation.

Oxygenated Hierarchically Porous Carbons

In one aspect, the activated HPCs may be functionalized via plasma gas and subsequent attachment mechanisms. A gas such as oxygen can become a plasma that is comprised of various charged and uncharged moieties, but the oxygen radicals (C) are of particular interest. These oxygen radicals are highly reactive, and when they randomly contact the activated HPC surface, they can react to form oxygen groups on the surface. The predominant oxygen-containing groups formed are carbonyl groups (C=O), which have a negative charge on the oxygen atom due to its electronegativity compared to the carbon atom. Ideally, the porosity, surface area, morphology, and other textural properties of the HPCs remain unchanged, while the HPC surface supports an increased number of oxygen-containing groups and associated negative charges.

Figure 6A:
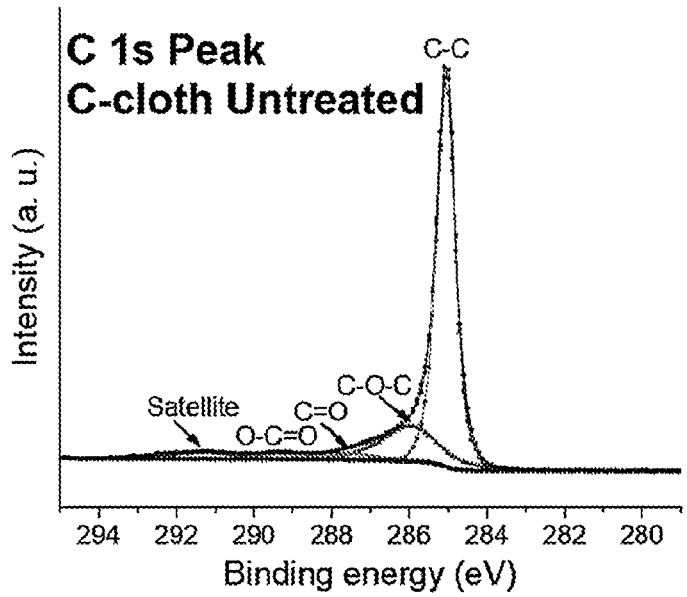
FIG. 6A illustrates a high resolution XPS scan of the C1s peak for unmodified carbon cloth.
Figure 6B:
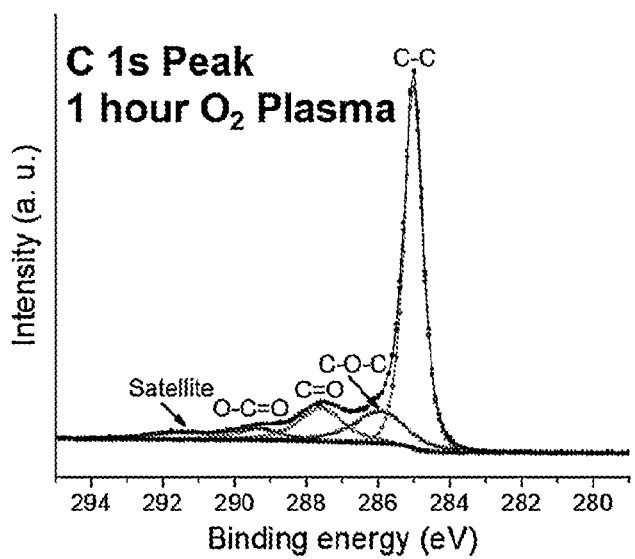
FIG. 6B illustrates a high resolution XPS scan of the C1s peak for carbon cloth with 1-hour $O_2$ plasma treatment.

FIG. 5 illustrates example XPS analysis for $O_2$ plasma functionalization of carbon. The top section of Table 2 relates to $O_2$ plasma functionalization of porous carbon cloth and compares the oxygenation profile of porous carbon (neat) versus porous carbon that has been subjected to 60 min of $O_2$ plasma treatment. The elemental atomic concentration of oxygen was significantly enhanced in the porous carbon after $O_2$ plasma treatment. A high resolution XPS scan of the C1s peak for the unmodified carbon cloth is shown in FIG. 6A and is dramatically changed after $O_2$ plasma treatment, as shown in FIG. 6B. FIG. 6B reveals an enhanced C=O peak and, to a lesser degree, an O—C=O peak. These groups impart a negative charge on the carbon surface via the electronegativity of the oxygen atom versus the carbon atom $C^{\delta+}=O^{\delta-}$.

Figure 10:
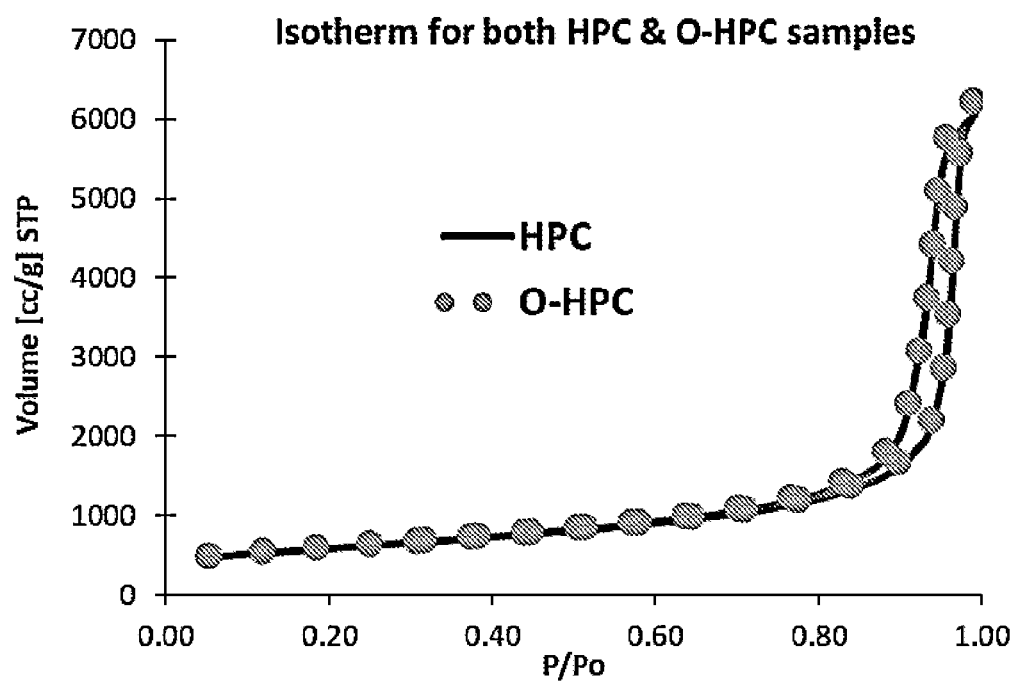
FIG. 10 is an overlap of the nitrogen porosimetry isotherms of the HPC and the O-HPC samples shown in FIGS. 8 and 9, respectively.

The bottom section of Table 2 relates to $O_2$ plasma functionalization of activated HPCs and compares the oxygenation profile of the HPCs—HPC-1-act (neat) versus and HPC-1-act that has been subjected to 60 min of $O_2$ plasma treatment. Again, the elemental atomic concentration of oxygen was significantly enhanced after $O_2$ plasma treatment, as shown in Table 2. Moreover, the $O_2$ plasma treatment on the HPC materials did not affect the textural characteristics of the HPC, as shown by the nearly identical $N_2$ adsorption isotherms between the neat and $O_2$ plasma treated, activated HPC (FIG. 10). Strikingly, and distinguishable from other oxidizing treatments for carbon (chemicals such as acids, thermal treatments, and even sometimes plasma treatment), the calculated high SSA (>2000 $m^2/g$) and pore volume (>5 $cm^3/g$) of the original HPC material were within ~3% of the corresponding values for O-HPC.

Metal Nanoparticles

As described, the O-HPC surface is negatively charged and is also hydrophilic, as a function of the high oxygen content. The hierarchical nature of the O-HPCs (large first order pores, extending into smaller second order pores, extending into even smaller third order pores) allows for the easy ingress/egress of water and aqueous based solutions/suspensions/mixtures. Thus, the O-HPC surfaces provide an accessible anionic anchoring point for metal ions, which may be reduced to metal nanoparticles.

By way of example only, an aqueous solution of a water-soluble silver salt (such as AgI, $Ag_3PO_4$, AgBr, $Ag_2C_2O_4$, $Ag_2CO_3$, AgCl, $Ag_2SO_4$, $AgBrO_3$, $AgNO_3$, or AgF) may be applied to the anionic surface of the O-HPC, whereupon the silver ions attach to the negatively charged surface. The silver ions may be reduced to silver nanoparticles using common chemical reducing agents, such as, for example, dimethylformamide, sodium borohydride, hydrazine, and the like, or mixtures thereof.

Various products may be prepared using the above-described methods and taking advantage of the biocidal properties of silver nanoparticles. For example, the resultant silver nanoparticle-embedded O-HPC material ("O-HPC-Ag") can be used for water treatment. Because of the abundant porosity due to the unique and tunable HPC porous scaffold (and the retention of those properties upon conversion to an O-HPC), the O-HPC-Ag includes good water permeability and easy flow through the O-HPC-Ag material (sometimes referred to as "flux"). Further, the O-HPC-Ag material includes multiple order-of-magnitude length scales of porosity. Such an arrangement allows for the capture of various sizes of contaminants within the contaminated influent water, while the silver nanoparticles kill harmful organisms (such as viruses and bacteria) at 99.2%, effectively disinfecting the influent water. The third order, sub-4 nm pores adsorb odor and taste compounds, such that the filtered effluent water is not only potable, clean, and disinfected, but also includes a suitable taste. The three distinct order-of-magnitude spanning pores present in the HPC materials have been demonstrated to retain a larger percentage of their initial flux after filtering actual wastewater when compared to conventional porous carbon systems with only a single pore size for both microporous carbons (<2 nm pores) or mesoporous carbons in the 10's of nm range for hundreds of $L/m^2$ of influent water.

This arrangement is important for water treatment where easier flow through the O-HPC-Ags provides higher flux and less time waiting for the water to get from the contaminated influent container, though the O-HPC-Ag filter (see 708 in FIG. 7), to the cleaned effluent container below. Also, the silver ions that are vital for the biocidal effectiveness in the O-HPC-Ag have an easier path from the silver nanoparticles to the harmful microorganisms due to the open, highly porous structure of the O-HPC-Ag. Finally, as noted above, the third order, sub-4 nm pores present in the O-HPC-Ag material will capture taste and odor compounds (as well as other small molecules via adsorption, such as dye molecules), without negatively impacting the taste of the filtered water, since no chlorine, iodine, or other negative-tasting elements will be needed to kill the pathogenic microorganisms.

Figure 7:
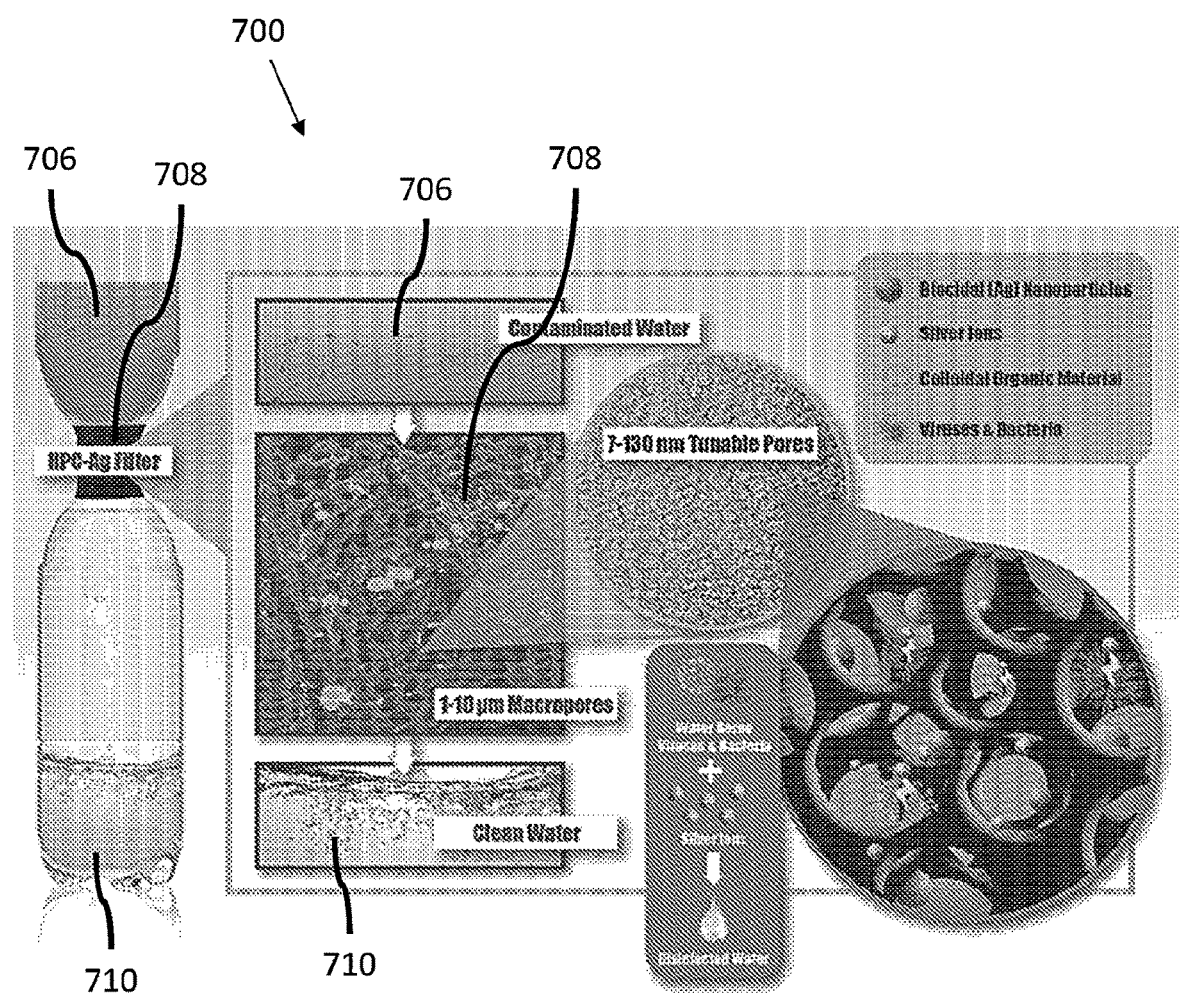
FIG. 7 illustrates an example water purification system 700.

FIG. 7 illustrates an example water purification system 700. System 700 directs contaminated water 706 through an O-HPC-Ag filter 708 to yield clean water 710. O-HPC-Ag filter 708 may include second order 7-130 nm tunable pores configured to both trap contaminants and kill water borne viruses and/or water borne bacteria. System 700 may use O-HPC-Ag filter 708 as the primary filter technology in a point-of-use water purification system 700. System 700 may use O-HPC-Ag filter 708 as the primary filter technology in a point-of-entry water purification system 700 designed to filter all water coming into a building, such as a home, for example.

In another aspect, any of the aforementioned processes, methods, and devices could be used for adding copper nanoparticles to a material. Copper nitrate may be used in the place of silver nitrate and reduced to copper nanoparticles in the same manner as silver. Indeed, many other water-soluble salts, e.g., other nitrate-based salts, may be used as nanoparticle precursors, including without limitation, iron nitrate and the like. For example, iron nitrate may be reduced into iron oxide that can bind to arsenic, thereby forming an O-HPC-Fe nanocomposite filter useful for arsenic removal.

EXAMPLES

Example 1: HPC Synthesis

In a synthesis process for HPC materials (see FIG. 1), an aqueous suspension of colloidal silica is mixed under medium stirring with sucrose or glucose. The mixture is poured into an aluminum mold. The mold is placed into an open container, whereupon liquid nitrogen is poured into the container until the liquid nitrogen level is just below the top of the mold. After the mixture is completely frozen, the mold is moved into a lyophilizer (such as a Labconco Freezone 12 plus) for freeze drying. After the water is completely removed via sublimation, the resultant material is placed into a high temperature tube furnace (such as a GSL-1700-X, manufactured by MTI Corp.) where it undergoes pyrolysis under an argon environment, reaching a target temperature of 1,000° C. at a ramp rate of 3° C./min. The sample is held at 1,000° C. for 3 hours and cooled to room temperature at a rate of ≤3° C./min. The resultant carbon-silica composite sample is placed in 3M NaOH under medium stirring at 80° C. overnight to remove the silica, forming the second order (7-130 nm) pores. A range of pore sizes can be selectively tuned by varying the size of the colloidal silica (4-130 nm) and from the ratio (by wt.) of the silica to the sucrose/glucose precursor (see FIG. 3). After etching the silica, the porous carbon is washed with DI water until a pH of 7 is reached, whereupon the sample is dried in a vacuum oven at 80° C. overnight. The final product is an HPC material with ~8 micron first order pores from the ice templating (see FIGS. 2A & 2B) and second order (7-130 nm) pores from the silica hard template. For the physical activation process, the HPC sample is placed into the tube furnace and heated to 900° C. at a ramp rate of 5° C./min under argon. Once at 900° C., $CO_2$ gas is introduced at a flow rate of 50 cm/min until the desired textural properties are achieved.

In one example synthesis process for the HPC material, a 15 wt. % aqueous suspension of 4 nm colloidal silica (Alfa Aesar, Thermo Fisher Scientific) was mixed under medium stirring with sucrose (the ratio of silica to sucrose is 2:1 by wt.). After undergoing the procedure outlined above, including physical activation for 10 h, an HPC material was provided with a measured BET specific surface area of 2675 $m^2/g$ and a maximum pore volume value of 10.6 $cm^3/g$, with at least 10.0 $cm^3/g$ derived from second and third order pores of 100 nm or smaller, corresponding to a sub-100 nm void space content of ~95 vol. %.

Example 2: O-HPC Synthesis

The HPC was introduced into a plasma chamber (Harrick Plasma Inc.) at a pressure below 60 mTorr to remove the air from the chamber. The remaining air was flushed out by introducing $O_2$ gas into the chamber at a flow rate of 35-40 cc/min. The flow rate was regulated until a pressure of roughly 1050 mTorr was reached. The oxygen was allowed to continue flowing for 5-10 min, whereupon the gas flow was turned off until a low pressure of 50 mTorr was reached. The $O_2$ gas flow was turned on until a pressure of 550 mTorr was reached (flow rate 10-15 cc/min). The RF power was turned on and set on "high" (29.6 W) for the desired amount of time, typically varying from 2 min to 1 hour.

Figure 8:
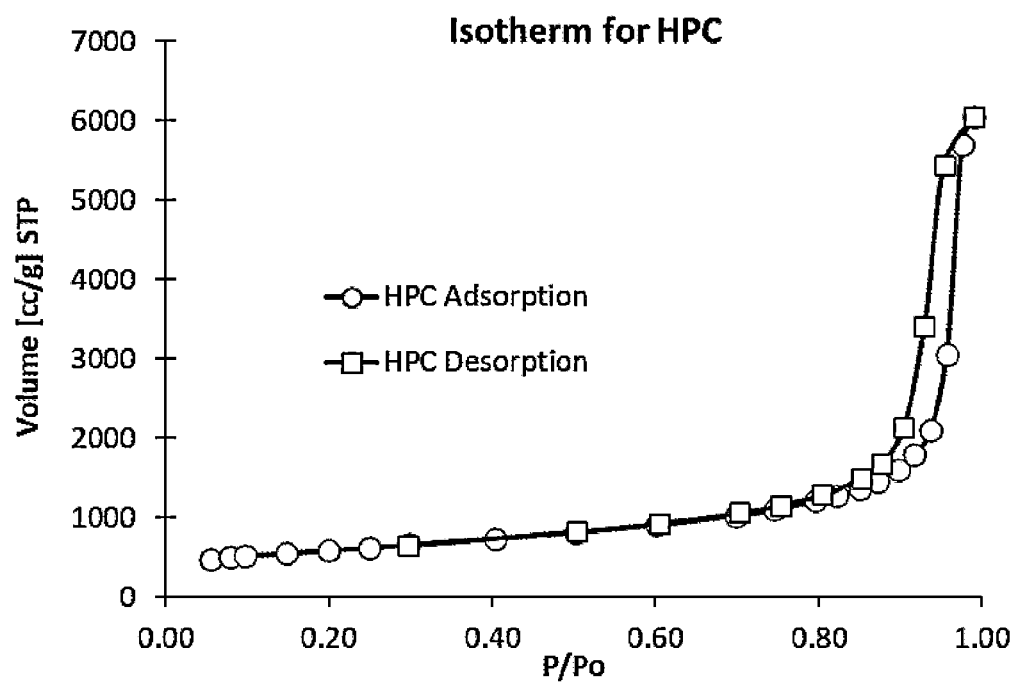
FIG. 8 is a nitrogen porosimetry isotherm of an HPC sample prepared as described in Example 1.
Figure 9:
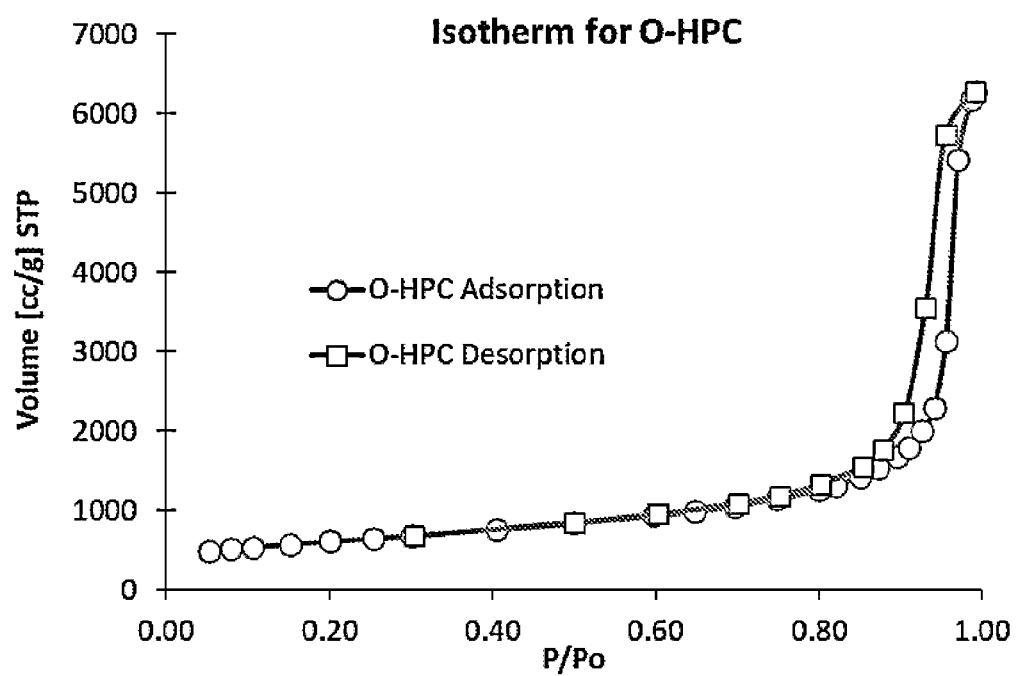
FIG. 9 is a nitrogen porosimetry isotherm of an O-HPC sample prepared as described in Example 2.

A representative HPC was prepared and synthesized with 4 nm colloidal silica at a weight ratio of 3:1 of silica to sucrose, which underwent physical activation for 3 h, as otherwise described in Example 1. The as-prepared HPC sample resulted in the nitrogen porosimetry isotherm as shown in FIG. 8. The HPC sample was treated under oxygen plasma as described previously, with an oxygen plasma time of 1 hour to yield the O-HPC. The measured nitrogen isotherm for the O-HPC sample is shown in FIG. 9. Both samples' isotherms are plotted and shown together FIG. 10, revealing good overlap of the isotherms and, thus, their textural properties. FIG. 11 (Table 3) shows the analysis of the HPC and O-HPC isotherms and the values for the various textural properties, further demonstrating the excellent overlap (all of the respective values show roughly 3-7.5% difference in values, in line with experimental error).

Figure 12:
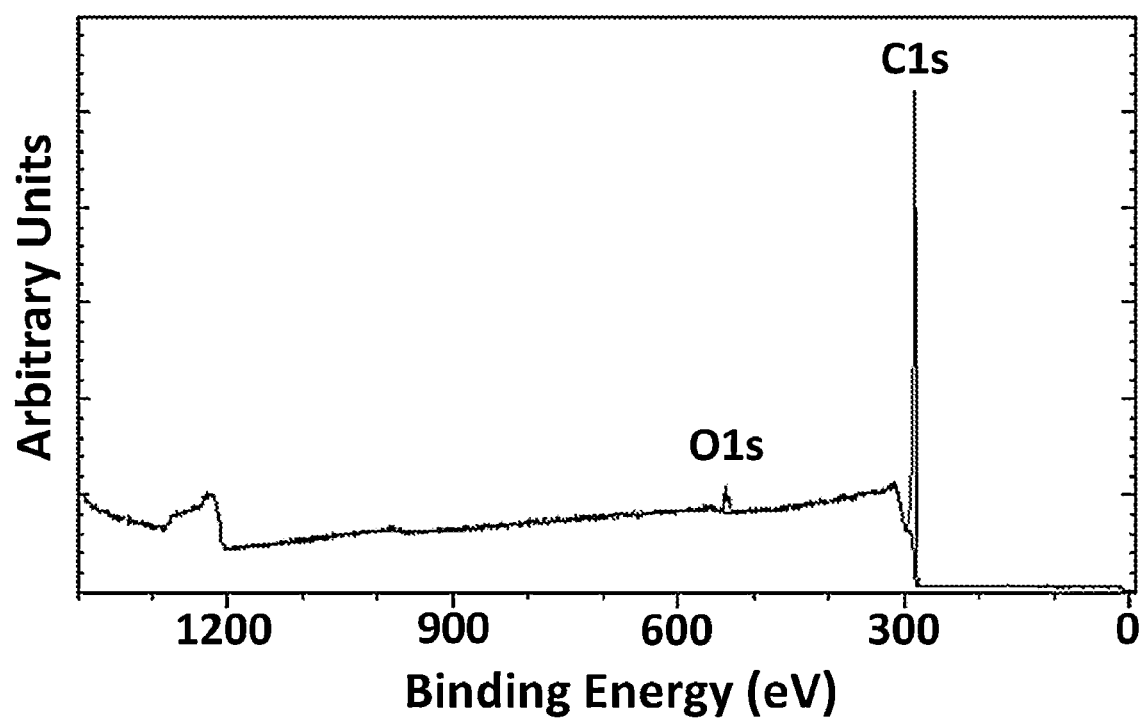
FIG. 12 is an XPS survey spectrum of a representative HPC sample such as described in Example 1 and shows the representative oxygen and carbon peaks.
Figure 13:
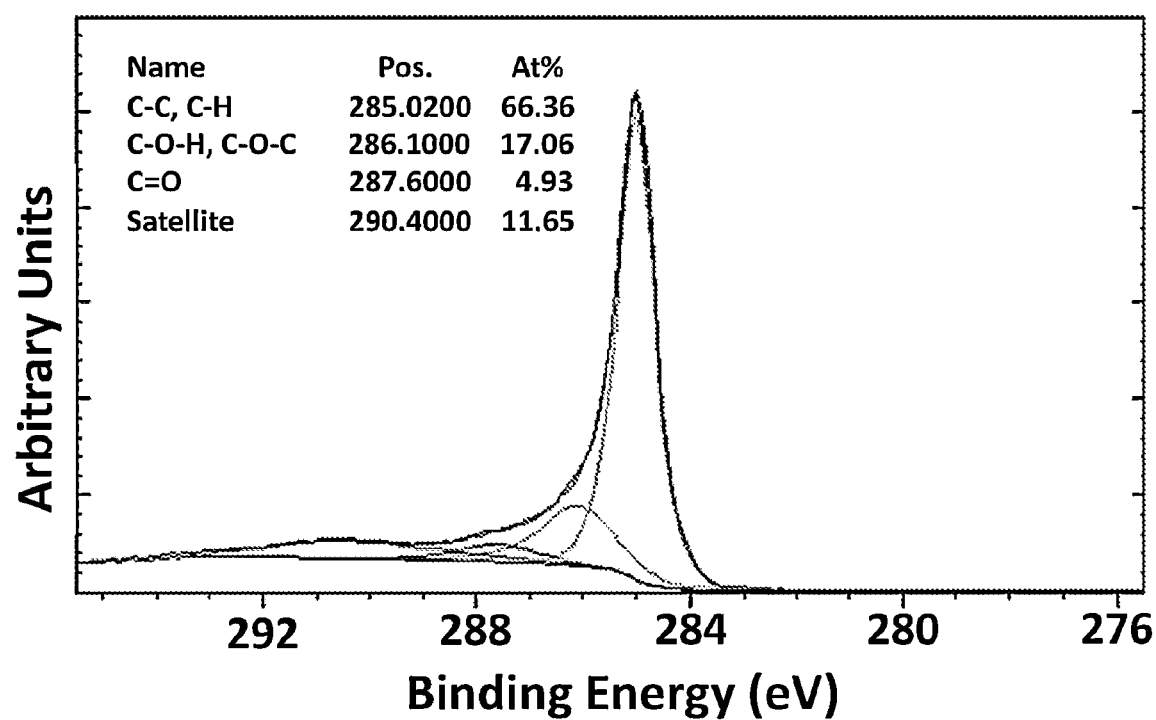
FIG. 13 is a high-resolution scan and deconvolution of the HPC XPS curve shown in FIG. 12.
Figure 14:
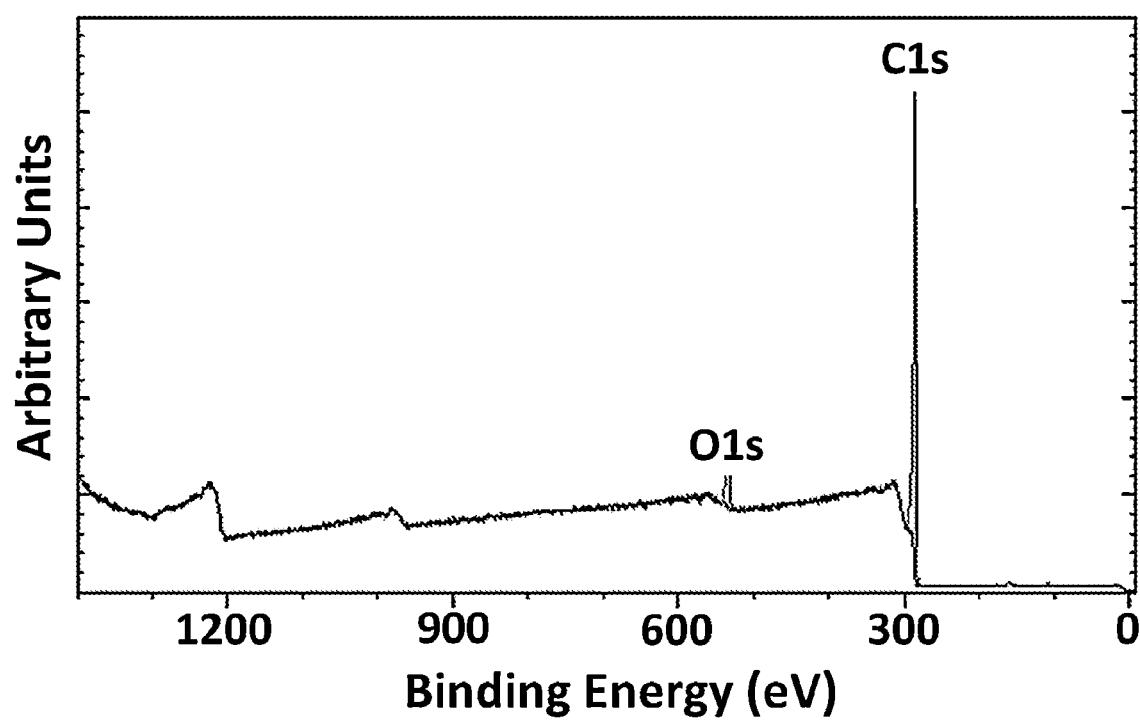
FIG. 14 is an XPS survey spectrum of a representative O-HPC sample such as described in Example 2 and shows the representative oxygen and carbon peaks.
Figure 15:
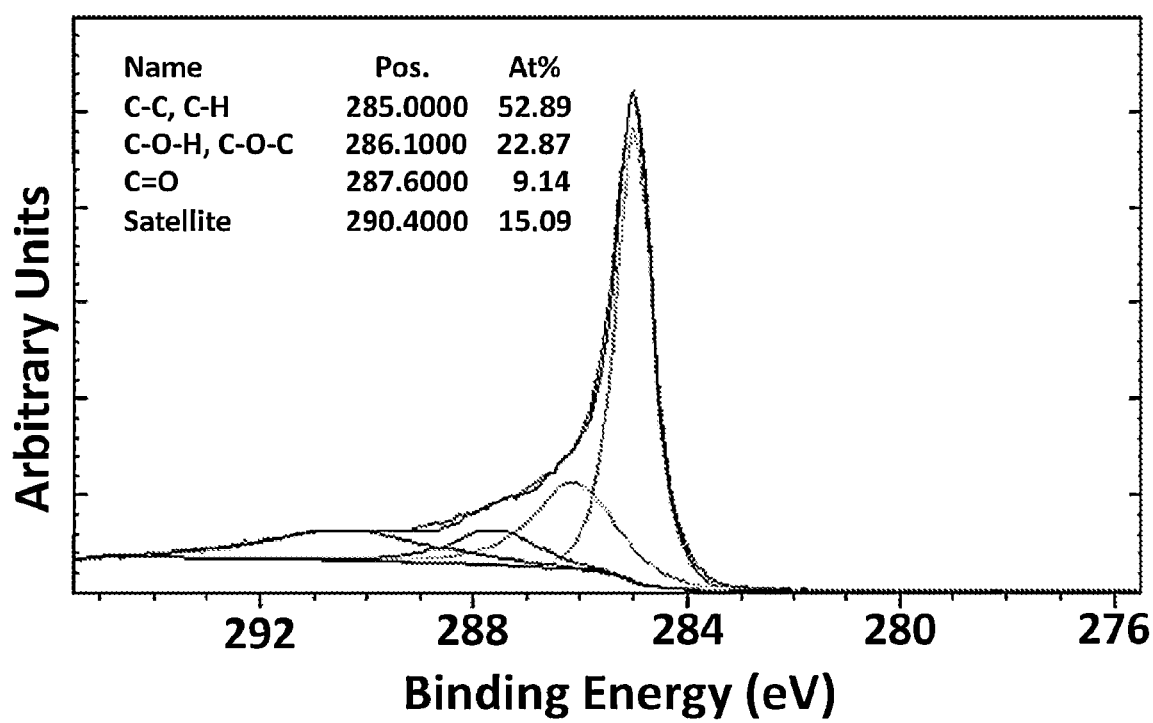
FIG. 15 is a high-resolution scan and deconvolution of the O-HPC XPS curve shown in FIG. 14.

The O-HPC sample was characterized for oxygen content via XPS. The survey spectrum of the HPC sample (FIG. 12) shows the representative oxygen and carbon peaks for the HPC material without plasma treatment to have a total oxygen content of 3.6 atomic percent (At %). The high-resolution scan and deconvolution of the curves for the HPC material (FIG. 13) reveal a carbonyl group content of 4.93 At %. This slight negative charge not only increases the HPC material's hydrophilicity but provides an anchoring point for the metal cation. For the plasma treated O-HPC material, the XPS survey spectrum (FIG. 14) reveals a higher oxygen content of 6.3 AT %, close to doubling the HPC sample. The high-resolution scan for the O-HPC material (FIG. 15) shows a higher carbonyl content as well, 9.14 At %, again close to double the original carbonyl content for the HPC sample.

Example 3: O-HPC-Ag Synthesis

Two different silver impregnated samples were synthesized, one with a lower silver content and one with a higher silver content. For the lower silver content sample (O-HPC-Ag-10), 50 mg of the O-HPC, having a void space volume available of at least 0.235 $cm^3$ (determined by multiplying the mass of the sample by the pore volume), was mixed into a slurry via a stainless-steel spatula in a glass vial with a solution of aqueous silver nitrate having at least the same volume as the void space available, i.e., 10 mg of $AgNO_3$ and 235 mg of DI water. The mixture was allowed to dry overnight, allowing capillary forces to move the solution into the second order and third order sub-100 nm pores. The sample was fully dried in a vacuum oven at 80° C. before being placed into a vial of 15 mL of dimethylformamide ("DMF") and sonicated for 20 min (to reduce the Ag(I) to Ag(0)). The sample was washed with at least 2 liters of DI water via filtration to remove the DMF.

A sample with a larger silver content (O-HPC-Ag-75) was synthesized in an identical fashion, except for the amount of silver nitrate added to the water, which was 75 mg.

Figure 16:
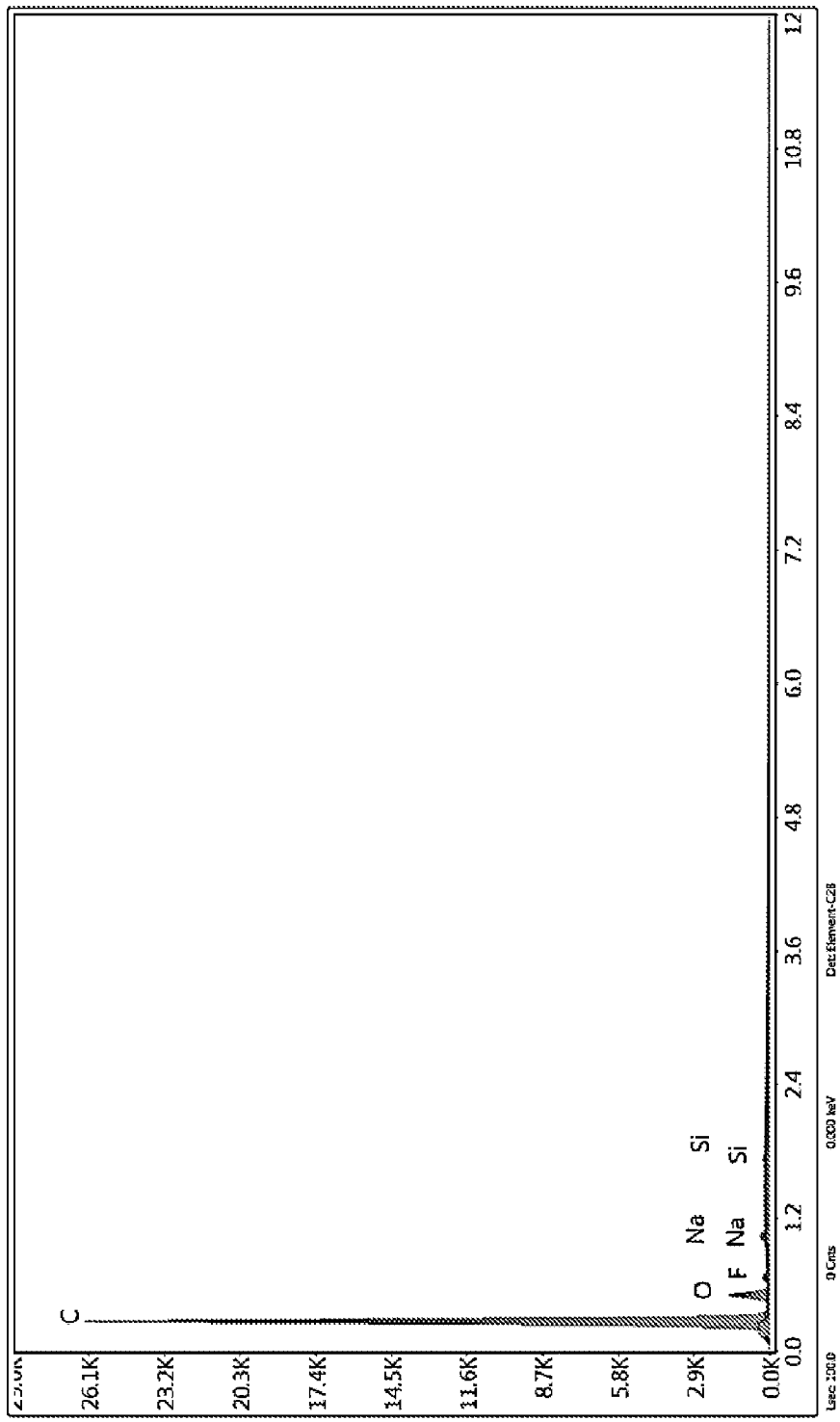
FIG. 16 is an energy dispersive X-ray spectroscopy ("EDS") spectrum for O-HPC and shows no silver present.
Figure 17:
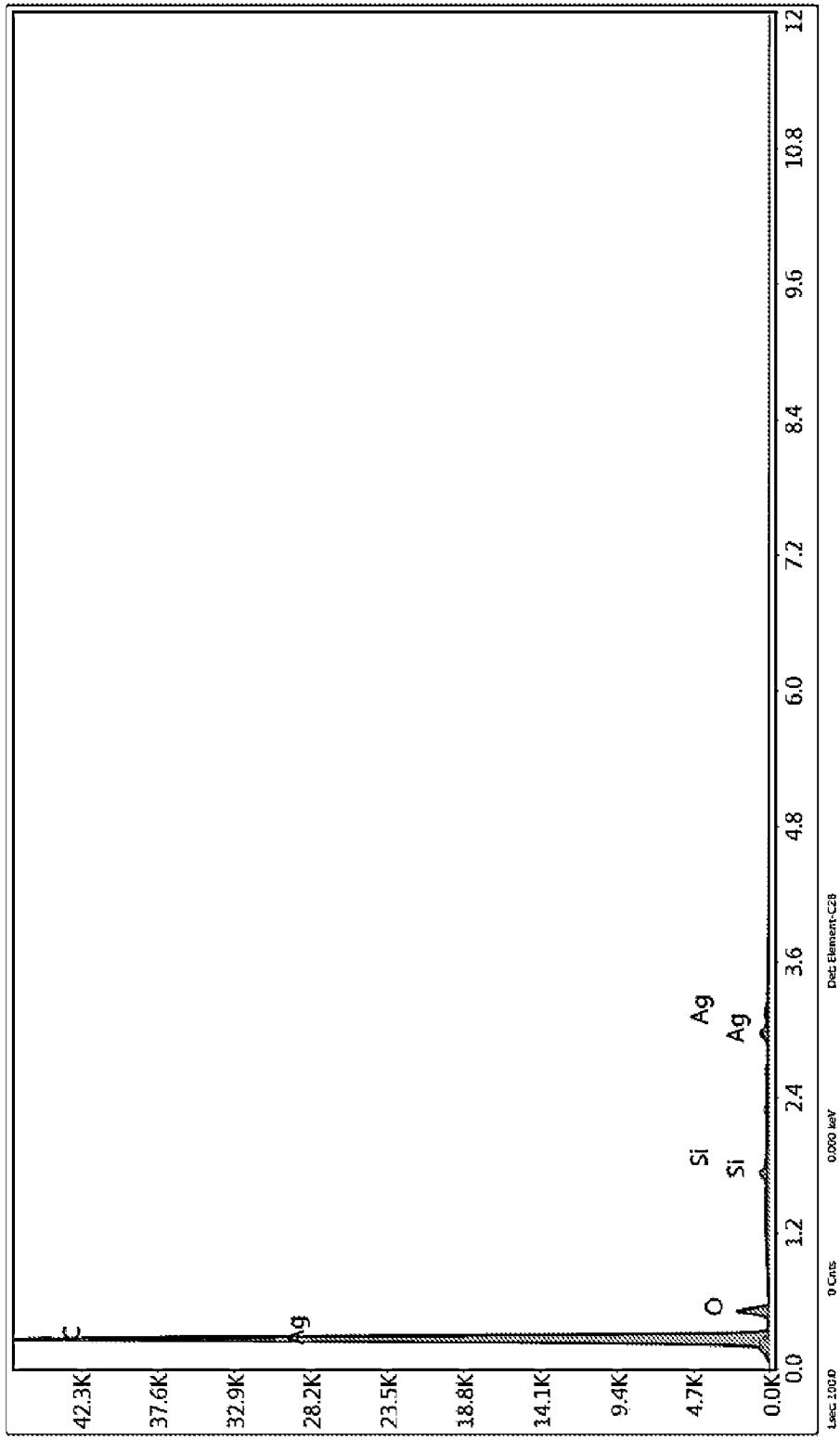
FIG. 17 is an EDS spectrum for a silver impregnated O-HPC sample.
Figure 18:
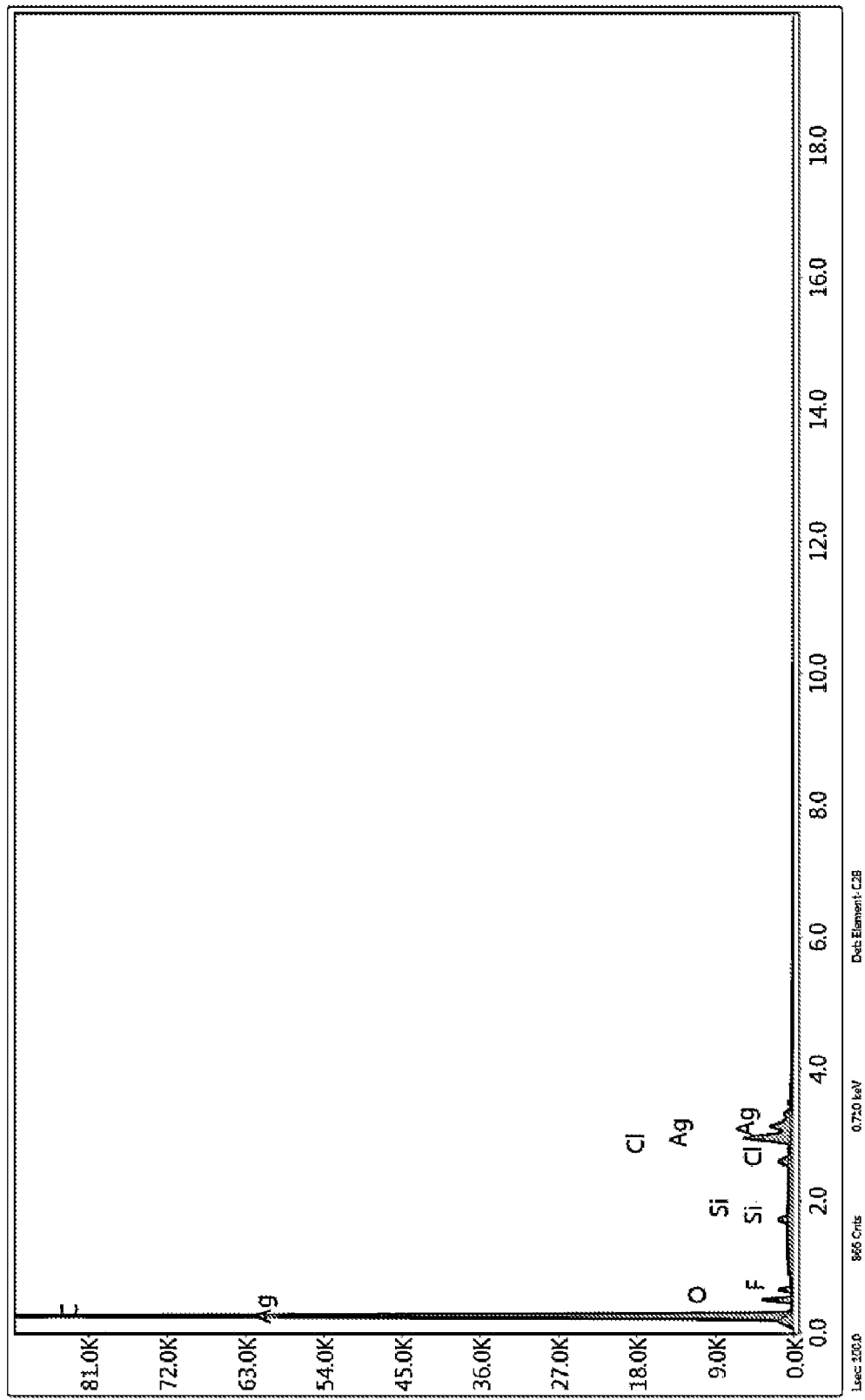
FIG. 18 is an EDS spectrum for a silver impregnated O-HPC sample.

EDS was used to determine the silver content for the O-HPC, the O-HPC-Ag-10, and the O-HPC-Ag-75. The EDS spectrum for the O-HPC sample (FIG. 16) reveals no silver present for the sample. The EDS data for the O-HPC-Ag-10 sample (FIG. 17) reveals a low amount of silver peaks present, calculated to be 1.84 Wt %. The EDS data for the O-HPC-Ag-75 sample (FIG. 18) reveals larger silver peaks present that reflect a silver content of 8.69 Wt %.

Example 4: Silver Impregnated O-HPC Materials for Water Treatment

1. As an Antimicrobial Material for Bacterial Removal:

The high silver content (O-HPC-Ag-75) sample was tested for its bacterial removal capability. The sample (in triplicate) was introduced to 10 mL of environmental water obtained from Delco Park (Kettering, Ohio) pond water that contained various types of environmental bacteria. The testing procedure followed was Hach Method 10029, described briefly as follows. 0.125 mg of the O-HPC-Ag-75 was contained and well dispersed in 5 mL of ultrapure water, which was then introduced into an amber vial, followed by 10 mL of the environmental water and an additional 15 mL of ultrapure water for a total mixture of 30 mL. A control sample of 10 mL of environmental water was also added to an amber vial with an additional 20 mL of ultrapure water, as a control. The two samples were shaken briefly by hand to ensure the carbon went into the water and settled to the bottom of the vial, and the samples were placed in a rotating mixer for 20 min. The Hach Method 10029 is a membrane filtration method that requires use of m-coliBlue broth and, thus, once the samples were rotated in contact with the environmental water for 20 min, the contents of the vials were poured and filtered using membrane filters and the manifold system according to method 10029. The membrane filters were removed with sterile tweezers and placed on a padded petri dish that had m-coliBlue broth poured over the pad. The petri dishes were inverted and placed in the incubator for 24 hours (according to Method 10029). The petri dishes were removed from the incubator, and the number of red and blue colonies was counted for each sample. The total number of isolated colonies was the total coliform bacteria count. The blue colonies are specifically *E. coli* only, and the red colored colonies are the various other coliform bacteria.

Figure 19A:
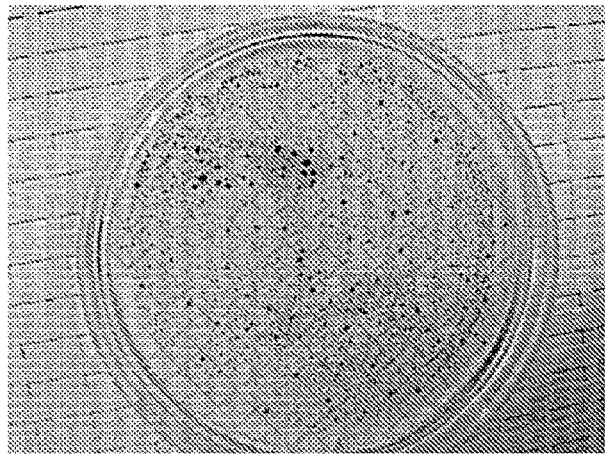
FIGS. 19A-C show a total coliform count for environmental water with no interaction with an O-HPC-Ag sample (FIG. 19A), after interaction with the O-HPC-Ag-75 sample (FIG. 19B), and a summary of the results (FIG. 19C).
Figure 19B:
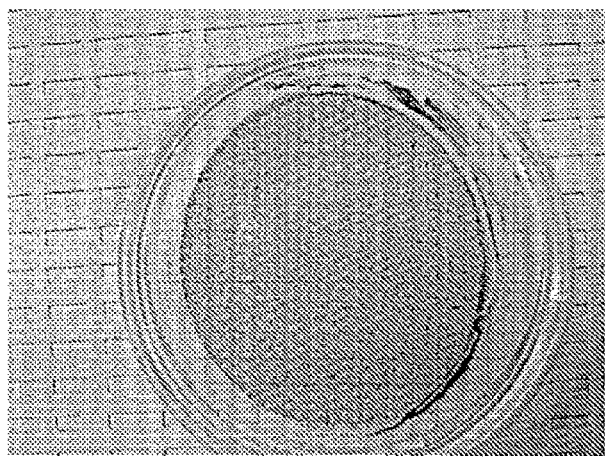
Figure 19C:
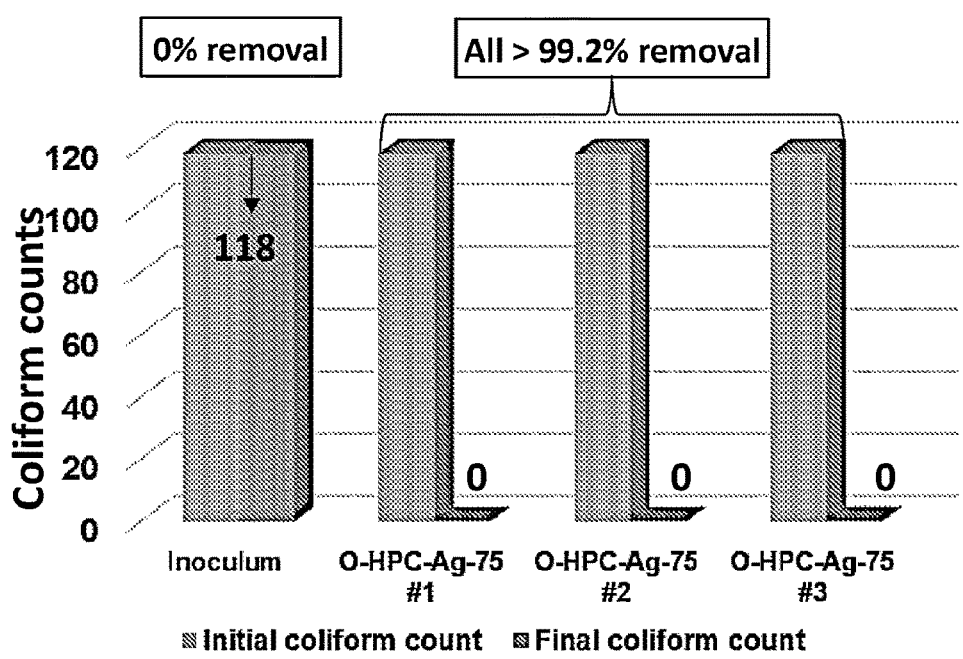

The total coliform count for the environmental water with no interaction with either carbon was 118 colonies (FIG. 19A). The O-HPC-Ag-75 sample (FIG. 19B) had zero visible colonies for all three samples, meaning the removal rate was at least 99.2%. The results are summarized in FIG. 19C.

2. As a Multifunctional Water Treatment Device by Also Removing Typical Water Contaminants Such as Methylene Blue Dyes:

The O-HPC-Ag-75 sample that underwent the bacterial removal testing was also tested for methylene blue (MB) dye removal. 1.2 mg of the O-HPC-Ag-75 was placed into a 24 mL amber vial with ultrapure water and dye for a concentration of 0.5 mg/L. The sample was placed in a rotating mixer for 24 hours and the resultant sample was filtered through a 0.22 micron filter to remove the carbon samples that had adsorbed the MB dye. The remainder water (and potentially, dye) was measured via a Red Tide USB650 Ultraviolet-visible spectroscopy (UV-Vis) device. The samples revealed a complete removal of the peak at 665 nm that is associated with MB dye.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. The term "about" in conjunction with a number is simply shorthand and is intended to include ±10% of the number. This is true whether "about" is modifying a stand-alone number or modifying a number at either or both ends of a range of numbers. In other words, "about 10" means from 9 to 11. Likewise, "about 10 to about 20" contemplates 9 to 22 and 11 to 18. In the absence of the term "about," the exact number is intended. In other words, "10" means 10.

As stated above, while the present application has been illustrated by the description of alternative aspects thereof, and while the aspects have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A method for making a metal-impregnated, oxygenated hierarchically porous carbon (an "O-HPC-M"), the method comprising:
   (A) preparing a hierarchically porous carbon (an "HPC"), the preparing comprising the steps of:
      (1) mixing a carbon precursor with water and silica;
      (2) freezing the mixture to form a solid carbon precursor-silica composite comprising first order pores on a surface of the solid carbon precursor-silica composite, the first order pores having an average diameter of about 1 μm to about 10 μm, and further comprising walls separating each first order pore;
      (3) subliming frozen water from the frozen mixture;
      (4) pyrolyzing the solid carbon precursor-silica composite to form a carbon-silica composite, a surface of which maintains the first order pores and the walls; and
      (5) etching away the silica from the carbon-silica composite to form an HPC, a surface of which maintains the first order pores and the walls, the etching further forming second order pores in the walls, the second order pores having a peak diameter between about 7 nm and about 130 nm;
   (B) physically activating the HPC surface, thereby introducing into the walls third order pores having an average diameter of less than about 4 nm;
   (C) treating the activated HPC surface with an $O_2$ plasma to oxygenate and thereby induce a negative charge on at least a portion of the activated HPC surface to form an oxygenated hierarchically porous carbon (an "O-HPC");
   (D) contacting the O-HPC's surface with an aqueous solution of a water-soluble metal salt, whereupon the metal ions attach to the O-HPC surface to form an O-HPC-M precursor; and
   (E) reducing the attached metal ions of the O-HPC-M precursor into metal nanoparticles to form the O-HPC-M.

2. The method according to claim 1, wherein the carbon precursor is selected from the group consisting of a saccharide, a cellulosic material, and a polyacrylonitrile, or a mixture thereof.

3. The method according to claim 1, wherein the subliming is performed by freeze drying.

4. The method according to claim 1, wherein the etching is performed by contacting the carbon-silica composite with a strong base.

5. The method according to claim 1, wherein the physically activating is performed by flowing $CO_2$ gas over the HPC surface at an elevated temperature.

6. The method according the claim 1, wherein the water-soluble metal salt is selected from the group consisting of AgI, $Ag_3PO_4$, AgBr, $Ag_2C_2O_4$, $Ag_2CO_3$, AgCl, $Ag_2SO_4$, $AgBrO_3$, $AgNO_3$, or AgF, or a mixture thereof, and the metal nanoparticles are silver nanoparticles.

7. The method according to claim 1, wherein the reducing is performed by contacting the O-HPC-M precursor with a chemical reducing agent.

8. The method of claim 7, wherein the chemical reducing agent is selected from the group consisting of sodium citrate, ascorbate, elemental hydrogen, polyol process, Tollens reagent, N, N-dimethylformamide (DMF), poly (ethylene glycol)-block copolymers, sodium borohydride, and hydrazine, or mixtures thereof.

\* \* \* \* \*